United States Patent Office 3,746,555
Patented July 17, 1973

3,746,555
PROCESS FOR PRODUCING A DENTAL CEMENT AND PRODUCT PRODUCED THEREBY
Joseph C. Muhler, Indianapolis, Ind., assignor to Indiana University Foundation, Indianapolis, Ind.
No Drawing. Continuation-in-part of application Ser. No. 854,794, Sept. 2, 1969. This application June 7, 1971, Ser. No. 150,800
Int. Cl. C09k 3/00
U.S. Cl. 106—35
10 Claims

ABSTRACT OF THE DISCLOSURE

A dental cement having improved anticariogenic and cement solubility characteristics may be produced by incorporating up to about 20% stannous fluoride ($SnF_2$), stannous hexafluorozirconate ($SnZrF_6$), indium fluorozirconate ($InZrF_7$), zirconium hexafluorogermanate ($Zr[GeF_6]_2$), zirconyl hexafluorogermanate ($ZrOGeF_6$), or indium hexafluorogermanate ($In_2[GeF_6]_3$) in a dental cement powder containing substantially no magnesium oxide (MgO) after the powder has been heat-treated (i.e., sintered) and processed to its desired particle size. The dental cement powder is heat-treated in the presence of an oxide of tin as a condensing agent prior to the addition of the fluoride compound.

CROSS-REFERENCE

This application is a continuation-in-part of applicant's co-pending United States patent application entitled Dental Cement, Ser. No. 854,794, filed Sept. 2, 1969.

BACKGROUND OF THE INVENTION

Field of the invention

This invention relates generally to dental cements and more particularly to zinc phosphate dental cements having improved anticariogenic and cement solubility characteristics.

Description of the prior art

Dental cements of the zinc phosphate variety have been employed by the dental profession for many years as a means for securely fastening various types of dental appliances and restorations, such as orthodontic bands, inlays, bridges, and caps, to the natural tooth structure in the oral cavity. Such cements are conventionally produced by mixing a zinc oxide (ZnO) with orthophosphoric acid ($H_3PO_4$), which produces a sticky, viscous material that will flow into the minute surface irregularities of the pieces being joined when the liquid cement is pressed between the pieces. The liquid dental cement then sets and hardens rapidly to form a crystalline matrix comprising, for the most part, zinc hydrogen phosphate

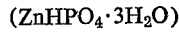
($ZnHPO_4 \cdot 3H_2O$)

The presence of the hardened cement in the surface irregularities of the pieces being joined tends to lock the pieces together, much as a wood glue holds two pieces of wood together.

The ability of a dental cement to hold a dental appliance or restoration securely in place in the oral cavity depends upon such physical properties as its hardness, its resilience, its solubility, and its ability to flow into the surface irregularities of the pieces being joined, and these properties are in turn dependent upon the speed at which the cements sets. If a cement sets too rapidly, for example, an excess amount of heat is generated and the crystalline matrix formation is disrupted and broken, and the hardened cement is brittle and crumbly. If, on the other hand, the cement sets too slowly, the dental operation may be unduly delayed and the liquid orthophosphoric acid may cause extensive erosion of the underlying tooth surface.

Commercial zinc oxide in its normal state is a very fine powder, which reacts much too rapidly with orthophosphoric acid for the production of a durable dental cement, so several procedures have been adopted in order to slow the rate of reaction between the two components.

Since the rate of reaction between an acid and a material being acted upon is necessarily dependent upon the amount of surface area exposed to the acid, one of the primary means for prolonging the reaction time in a zinc phosphate cement is to increase the particle size of the zinc oxide particles. The particle size or zinc oxide powder may be increased by heating the zinc oxide until the fine particles fuse together or sinter, thus producing a dense or heavy material that can be crushed and ground to almost any desired particle size.

The sintering or fusing temperature of pure zinc oxide is extremely high (i.e., about 3100° to 3200° F.) and such temperatures cannot be obtained with normally available heating furnaces, so most manufacturers add a condensing agent to zinc oxide powder in order to lower its sintering temperature. The condensing agent conventionally employed is magnesium oxide (MgO) in the range of about 3–15% by weight of the powder. Such powders may also contain relatively minor amounts of other modifiers, such as silica ($SiO_2$), rubidium trioxide ($R_2O_3$), or bismuth trioxide ($Bi_2O_3$), in order to further facilitate condensation or to improve the consistency or color of the dental cement. A zinc oxide powder comprising from 3–15% magnesium oxide (MgO) generally has a condensing temperature of between 1850° and 2500° F., and such temperatures can be reached easily in kilns lined with readily available refractories, thus reducing the cost of manufacture considerably.

While condensing agents other than magnesium oxide have heretofore been used (e.g., copper oxide), the prior art does not so far as applicant is aware teach the use of oxides of tin as condensing agents. The use of compounds supplying available (i.e., soluble) tin compounds such as stannous fluoride, stannous fluorozirconate, and the like is of course well known in the dental arts. However, such teachings are all predicated on the presence of soluble tin ions, normally Sn(II) ions (see e.g., Stookey et al., "Laboratory Studies Concerning the Effectiveness and Safety of Various Fluoride and Fluoride-Phosphate Systems," J. Dent. Res., 46:503, 1967; Muhler et al., "Relationship Between pH, Age and Concentration of Solutions of Stannous Fluoride and Sodium Fluoride in Decreasing Enamel Solubility and Effecting the Uptake of Fluoride," J. Dent. Res., 31:756, 1952; Halton et al., "The Removal of Fluoride From Dilute Solutions of Sodium Fluoride and Stannous Fluoride by Powdered Dental Enamel," J. Dent. Res., 34:350, 1950). The prior art thus does not teach that any therapeutic benefit would attach to the use of insoluble tin compounds, such as the oxides of tin, SnO and $SnO_2$, in a zinc phosphate dental cement.

In spite of the fact that zinc phosphate dental cements have been used widely, and, indeed, almost exclusively, for the past 60 years by the dental profession, with few significant improvements in composition during this time, there are several serious deficiencies in zinc phosphates dental cements where substantial improvements could and should be made. One of the most serious deficiencies in such cements is that, because the liquid phase of the dental cement is an acid (orthophosphoric acid), the dental cement has a relatively low pH (i.e., a pH of about 1.1 to 1.5 at the time the viscous cement is applied to the tooth surface). The action of the low pH cement on the tooth surface results in an immediate erosion and a decalcification thereof, thereby removing much of the natural barrier of the tooth surface to the later development of dental caries upon the exposure of the weakened tooth surface to the plaque and the oral flora carried thereby. This erosion is especially prominent when the dental cement is applied to the dentin underlying the enamel or bordering the enamel at the gingiva margin, a situation which frequently occurs in the mounting of orthodontic appliances.

Decalcification generally occurs only until the cement has set and the phosphoric acid has fully reacted with the zinc oxide powder, at which time the pH of the cement returns to about pH 7.0. Therefore, the setting time, or the length of time that the cement in its liquid phase remains in contact with the tooth surface, is an important factor in the dental erosion caused by a dental cement.

The re-exposure of weakened underlying tooth surfaces to the oral cavity and to the development of dental caries of course occurs whenever an orthodontic appliance is removed from the oral cavity, but there is even more danger of dental caries while the orthodontic appliance is still in the oral cavity, for it is well recognized that a second major deficiency of zinc phosphate dental cements is that they are somewhat soluble in water and are even more soluble in the mild acids present in the oral cavity, with solubility generally being inversely proportional to the pH of the oral environment. Due to the common inaccessibility of the cement-tooth contact area (gold crowns commonly extend gingivally and orthodontic bands often approximate the gingival margin, particularly on the proximal surfaces), oral hygiene in such areas is generally poor, thereby permitting the rapid and extensive accumulation of dental plaque and debris in the area of the dental cement. This results in an accumulation of oral acids within the plaque and a marked increase in the rate of cement dissolution and the rate of tooth surface re-exposure. Since these re-exposed tooth surfaces have been weakened by the liquid dental cement and are inaccessible to oral hygiene practices, these oral acids cause the development of extensive dental caries in these surfaces.

Thus, prior art dental cements incorporating anticariogenic agents have been deficient in at least three respects, namely, the cements have been ineffective in reducing initial enamel and dentin erosion; the cements have been ineffective in providing permanent protection for the underlying tooth surfaces; and, the cements have exhibited unsatisfactory solubility characteristics in the oral cavity.

Accordingly, it is an object of the present invention to provide a stable zinc phosphate dental cement that provides protection for tooth enamel, dentin, and cementum against initial decalcification caused by the liquid phase of the cement.

Another object of the present invention is to provide a zinc phosphate dental cement that provides permanent protection against dental caries for the tooth surfaces underlying the dental cement.

A further object of the present invention is to provide a dental cement with improved cement solubility characteristics.

Still another object of the present invention is to provide anticariogenic fluoride compounds that accomplish the above objectives when incorporated into dental cements without impairing the physical qualities of the cements.

Another object of the present invention is to provide a method for adding such anticariogenic agents to a dental cement without impairing the physical qualities of the cement or the effectiveness of the agent.

A further object of the present invention is to provide an improved dental cement powder that does not impair the effectiveness of an anticariogenic agent added thereto.

Another object of the present invention is to provide an improved condensing agent for the heat treatment of dental cement powder that enhances the therapeutic benefits obtainable from the anticariogenic agents and provides additional therapeutic benefits of its own, while it lowers the sintering temperature of the dental cement powder.

SUMMARY OF THE INVENTION

In accordance with the present invention, the above-noted deficiencies in the prior art may be eliminated and improved dental cement powder adapted for use in formulating an improved dental cement may be obtained by: admixing zinc oxide, ZnO, powder with about 3–15%, by weight of the cement powder of an oxide of tin to form a mixture, with no more than about 0.5% magnesium oxide, MgO, by weight of the cement powder being present in the mixture; sintering the mixture; mechanically reducing the sintered mixture into a powder having a particle size lying primarily in the range of about 2–10 microns; and thereafter admixing the powder with about 0.5 up to about 20%, by weight of the cement powder, of a member selected from the group consisting of stannous fluoride, $SrF_2$; stannous hexafluorozirconate, $SnZrF_6$; indium fluorozirconate, $InZrF_7$; zirconium hexafluorogermanate, $Zr(GeF_6)_2$; zirconyl hexafluorgermanate;

$ZrOGeF_6$;

indium hexafluorogermanate, $In_2(GeF_6)_3$; and mixtures thereof.

The resultant dental cement powder is thus capable of providing substantial protection for the underlying tooth surface against initial decalcification that would otherwise be caused by the orthophosphoric acid component of the dental cement, and it provides lasting protection against the subsequent development of dental caries on these tooth surfaces when they subsequently become re-exposed to attack by oral acids. Moreover, the rate of re-exposure of the underlying tooth surfaces is substantially lower when the cements of the present invention are employed, because these cements are significantly less soluble than conventional dental cements in the presence of the mild acids present in the oral cavity.

DESCRIPTION OF THE PREFERRED EMBODIMENTS

In accordance with the present invention, a zinc phosphate dental cement powder adapted for use in formulating a zinc phosphate dental cement having improved anticariogenic and cement and enamel solubility characteristics may be produced by: admixing zinc oxide, ZnO, powder with about 3–15%, by weight of the cement powder of an oxide of tin to form a mixture, with no more than about 0.5% magnesium oxide, MgO, by weight of the cement powder being present in the mixture; sintering the mixture; mechanically reducing the sintered mixture into a powder having a particle size lying primarily in the range of about 2–10 microns; and thereafter admixing the powder with about 0.5 up to about 20% by weight of the cement powder of a member selected from the group consisting of stannous fluoride, $SnF_2$; stannous hexafluorozirconate, $SnZrF_6$; indium fluorozirconate, $InZrF_7$; zirconium hexafluorogermanate, $Zr(GeF_6)_2$, zirconyl hexafluorogermanate, $ZrOGeF_6$; indium hexafluorogermanate, $In_2(GeF_6)_3$; and mixtures thereof.

As in conventional zinc phosphate dental cements, the primary ingredient in the dental cement powder of the present invention is zinc oxide, which is available commercially as an extremely fine and fluffy powder. The particle size of these powders rarely has an average particle diameter of more than 0.5 micron, and most oxides are in the neighborhood of 0.2–0.4 micron particle size.

Since, as discussed above, the rate of chemical reaction between a dental cement powder and a dental cement liquid is a function of the surface area of the dental cement powder exposed and the concentration of the acid mixed with the powder, a mixture of zinc oxide in its fluffy, natural state with orthophosphoric acid produces an immediate reaction, forming a brittle, porous, granular product with the generation of heat. In order to slow the reaction between the zinc oxide and the orthophosphoric acid, the natural zinc oxide is heat-treated or sintered until the particles agglomerate into larger particles which react more slowly with acid. During this sintering process zinc oxide particles become surface-fused into a porous zinc oxide "cake" which may then be ground or crushed to any desired particle size. The zinc oxide dental cement powder produced by the sintering and processing procedures of the present invention preferably has a particle size primarily in the range of about 2–10 microns.

Because the sintering temperature of pure zinc oxide is quite high (about 3100° F.), about 3–15% magnesium oxide is employed in most conventional dental cements in order to lower the sintering temperature of the zinc oxide powder to about 1800°–2500° F. However, in accordance with the present invention it has been found that the use of magnesium oxide as a condensing agent and its presence in the final product diminishes, and in most instances eliminates, the anticariogenic and other activity of the fluoride agent incorporated in the dental cement. When a conventional dental cement powder containing substantial amounts of magnesium oxide (i.e., about 3–15% magnesium oxide) is used as a base for the fluoride additives, the fluoride becomes trapped in the matrix structure of the cement as it hardens and is not released by the hardened cement for uptake by the tooth structure. Consequently, the effectiveness of such cements is limited to preventing the initial decalcification caused by the orthophosphoric acid while the cement is setting.

In order to avoid the drawbacks in conventional dental cement powders, magnesium oxide must not be used as a condensing agent and a zinc oxide dental cement powder that contains substantially no magnesium oxide must be employed in accordance with this invention. The source of zinc oxide must be chosen with care, so that the zinc oxide is substantially free from zinc oxide impurities. Such a zinc oxide powder should contain only a small quantity of impurities or color additives such as silica, iron, or alumina in addition to zinc oxide (ZnO). Such powders may inherently contain a minor amount (i.e., no more than about 0.5%) magnesium oxide as an additional impurity, but such small amounts of magnesium oxide do not materially affect the benefits obtainable from the fluoride compounds added to the dental cement powders, so long as the magnesium oxide is not present in appreciable amounts.

In order to facilitate sintering the zinc oxide powders it is preferred that a condensing agent other than magnesium oxide be used. In accordance with the present invention, it is preferred that an oxide of tin be employed as the condensing agent. Tin oxides do not inhibit the release of fluoride from the set dental cement and, in addition, provide therapeutic benefits which increase the value of the resulting product. Tin oxides are at least as effective a condensing agent as magnesium oxide and lowers the sintering temperature of the zinc oxide powder to 2500° F. or lower, which temperatures can be reached in kilns with readily available refractories.

The tin oxide employed may be either tin (II) oxide, SnO, or tin (IV) oxide, $SnO_2$. However, the tin (IV) oxide appears in the final product in any case since SnO is oxidized to $SnO_2$ during the sintering process.

Tin oxide may be added to the dental cement powder at a level of about 3–15% by weight of the dental cement powder. Dental cement powders incorporating about 5% tin oxide have been found to be particularly satisfactory.

As previously noted, the dental cements of the present invention also include about 0.5% up to about 20% and preferably between 2–10% of one of the following fluoride compounds: stannous fluoride ($SnF_2$), stannous hexafluorozirconate ($SnZrF_6$) indium fluorozirconate ($InZrF_7$), zirconium hexafluorogermanate ($Zr[GeF_6]_2$), zirconyl hexafluorogermanate ($ZrOGeF_6$), and indium hexafluorogermanate ($In_2[GeF_6]_3$). These compounds, particularly stannous fluoride, have been found to be quite effective in reducing the corrosiveness of the dental cement liquid (i.e., orthophosphoric acid), in providing permanent protection for the underlying tooth structure, and in reducing cement solubility.

All of these fluoride compounds have been found to be effective in reducing cement and enamel solubility when as little as 0.5% of the compound is added to the dental cement powder, but the quantity of fluoride released from the dental cement does not reach a substantial level until at least about 2% and preferably about 4% fluoride compound is added to the dental cement powder. At the 2% level, significant permanent protection for the underlying tooth surfaces is obtained from the fluoride released from the dental cement, and this amount of fluoride protection increases proportionately with the percentage of fluoride incorporated in the powder. At the 10% level, the protection obtained approaches the level of protection obtainable from a conventional topical fluoride treatment administered by a dentist. Although as much as 20% fluoride compound may be added without adversely affecting the physical properties of the cement, for practical purposes, an addition of about 4–10% fluoride compound to the dental cement powder provides a sufficient level of fluoride in most dental cements.

Aside from the presence of about 0.5–20% of one or more of the preferred fluoride agents and about 3–15% tin oxide, the remainder of the dental cement powders of the present invention comprises substantially pure zinc oxide. Accordingly, a cement powder in accordance with the present invention comprises about 65–97% zinc oxide by weight. A cement powder employing the preferred quantity of fluoride compound, namely, 2–10%, in addition to 3–15% tin oxide comprises about 75–95% zinc oxide.

An important aspect to the present invention is the manner in which the fluoride is added to the dental cement powder. It is essential that the fluoride be added to the powder subsequent to heat treatment in order that the therapeutic and anti-solubility effects may be realized. A further important aspect of this present invention is that the fluoride be added to the dental cement powder rather than to the orthophosphoric liquid. When the fluoride is added to the dental cement liquid, it must be added at the expense of the water portion of the liquid, and the percentage of water in the dental cement liquid is a critical factor affecting the setting time of the dental cement itself. Therefore, only a small quantity of fluoride (usually less than about 1%) may be added to a dental cement via the dental cement liquid, and this small quantity is not sufficient to provide permanent fluoride protection for the underlying tooth surfaces.

Moreover, some of the fluorides, stannous fluoride in particular, are unstable when added to orthophosphoric acid and therefore may not be added to the dental cement liquid until immediately prior to the preparation of the dental cement by the dentist. This, of course, makes the dental cement more difficult to prepare and more subject to defects in consistency due to errors in preparation. On the other hand, when added to the powder, the fluorides are stable and may therefore be added by the manufacturer under conditions where the exact quantities of the constituents added can be controlled accurately.

Consequently, the liquids employed in admixture with the cement powder of the present invention are the same as the dental cement liquids utilized in conventional zinc phosphate dental cements, and the methods used in preparing these liquids are well-known in the art. Such liquids are primarily orthophosphoric acid ($H_3PO_4$) but typically contain small quantities of aluminum hydroxide ($Al[OH]_3$) and/or zinc oxide (ZnO) in order partially to neutralize the orthophosphoric acid. As stated previously, the percentage of water present in these liquids is critical and must be adjusted in order to complement properly the dental cement powder with which it is used. Typical liquids contain between 20–30% water.

An exemplary process for making dental cement powders in accordance with the present invention is described in the following example.

EXAMPLE I

The cement powder is prepared for heat treating by thoroughly mixing accurately proportioned dry ingredients comprising about 95% zinc oxide (ZnO) and 5% tin oxide ($SnO_2$), and then packing this mixture in saggers or crucibles for the sintering or "burning" process. The filled crucibles are then placed in kilns for sintering. The kiln is heated slowly and carefully until the desired temperature of about 2500° F. is reached, and the temperature is held at this level for a period of time until the desired amount of condensation takes place.

The sintered mass is then cooled and the cakes of sintered cement are removed from the kiln to be ground and crushed to the desired particle size (i.e., about 2–10 microns). Grinding the cakes to the proper particle size is accomplished by automatic grinding machines and is carefully controlled in order to insure that particles of the proper size are produced. Measuring devices such as turbidmeters and air permeation instruments provide quick and reliable means for maintaining accurate control of the fineness of the zinc oxide dental cement powders.

After the cement has been heat treated and processed to its desired particle size, stannous fluoride ($SnF_2$) is added to the dental cement powder at a level of 10% by weight of the dental cement powder. The resulting cement powder is then ready for use.

The dental cement liquid is prepared by mixing a solution of orthophosphoric acid containing 25% water, 8% aluminum hydroxide ($Al[OH]_3$), and 5% zinc oxide (ZnO). The resulting liquid is then bottled for distribution along with the dental cement powder.

Other exemplary compositions of dental cement powders embodying the present invention are given in the following examples.

EXAMPLE II

| Constituent: | Parts by weight |
|---|---|
| Zinc oxide (ZnO) | 83.3 |
| Tin (IV) oxide ($SnO_2$) | 10.0 |
| Stannous fluoride ($SnF_2$) | 6.7 |

EXAMPLE III

| Constituent: | Parts by weight |
|---|---|
| Zinc oxide (ZnO) | 91 |
| Tin (IV) oxide ($SnO_2$) | 5 |
| Stannous fluoride ($SnF_2$) | 4 |

EXAMPLE IV

| Constituent: | Parts by weight |
|---|---|
| Zinc oxide (ZnO) | 85 |
| Tin (II) oxide (SnO) | 5 |
| Stannous fluorozirconate ($SnZrF_6$) | 10 |

EXAMPLE V

| Constituent: | Parts by weight |
|---|---|
| Zinc oxide (ZnO) | 80 |
| Tin (IV) oxide ($SnO_2$) | 15 |
| Indium fluorozirconate ($InZrF_7$) | 5 |

EXAMPLE VI

| Constituent: | Parts by weight |
|---|---|
| Zinc oxide (ZnO) | 65 |
| Tin (IV) oxide ($SnO_2$) | 15 |
| Zirconium hexafluorogermanate ($Zr[GeF_6]_2$) | 20 |

EXAMPLE VII

| Constituent: | Parts by weight |
|---|---|
| Zinc oxide (ZnO) | 97 |
| Tin (IV) oxide ($SnO_2$) | 3 |
| Zirconyl hexafluorogermanate ($ZrOGeF_6$) | 0.5 |

EXAMPLE VIII

| Constituent: | Parts by weight |
|---|---|
| Zinc oxide (ZrO) | 90 |
| Tin (IV) oxide ($SnO_2$) | 5 |
| Indium hexafluorogermanate ($In_2[GeF_6]_3$) | 5 |

EXAMPLE IX

| Constituent: | Parts by weight |
|---|---|
| Zinc oxide (ZnO) | 91 |
| Tin (IV) oxide ($SnO_2$) | 5 |
| Stannous fluoride ($SnF_2$) | 2 |
| Stannous fluorozirconate ($SnZrF_6$) | 2 |

The fluoride constituent of the cement powders given in the foregoing examples could of course be varied by providing one or more of the other fluoride agents in place of or in addition to the stannous fluoride.

Dental cements of the present invention may be utilized by the dental practitioner in the following manner.

It is not necessary to use a measuring device for proportioning the powder in the liquid, as the consistency may vary depending on the intended use. However, the maximum amount of powder possible for the operation at hand should be used in order to reduce the solubility and to increase the strength of the cement. The powder: liquid ratio recommended for the dental cements of the present invention generally should fall within a range of about 0.92–1.68 grams powder to about 0.5 ml. liquid. A preferred powder: liquid ratio is about 1.4 grams powder to about 0.5 ml. liquid.

A cool mixing slab should be employed. The temperature of the slab should not be below the dew point of the room, however, as water in the atmosphere could condense on the cold slab and upset the water balance of the dental cement liquid. The cool slab delays the setting of the dental cement and allows the operator to incorporate a maximum amount of powder before the crystallization proceeds to a point where the mixture stiffens.

Final mixing of the dental cement is initiated by the addition of a small amount of powder to a quantity of liquid poured on to the cool slab. This assists in neutralizing the acid and complements the buffering action of the salts present in the dental cement liquid. Additional powder is added to the liquid in small incremental quantities and is mixed with the liquid with a spatula, using a brisk rotary motion. Powder should be added gradually and the mixing continued until a cement having a desired consistency has been produced.

When the cement is ready for application, the cavity side of the inlay or the contact surface of the orthodontic appliance should be coated with cement first and then the surface of the prepared cavity should be coated. The inlay or appliance should be seated immediately before any crystallization of the cement occurs. After the inlay or appliance has been seated, it should be held under pressure until the cement sets.

EXPERIMENTAL EVALUATIONS

The effectiveness of the dental cement of the present invention has been demonstrated by laboratory studies designed to measure: (1) the short term and long range effects of the dental cement on enamel solubility; (2) the solubility of the dental cement in a sodium acetate buffer; and (3) the rate at which fluoride is released from the set dental cement.

In order to determine the protection afforded by the experimental dental cements for the underlying tooth surfaces, each dental cement sample was placed on a specimen of dental enamel and allowed to harden for 15 minutes. Then, the samples were divided into two groups and were placed in distilled water. One group of samples was left in the water for 24 hours and the other group for seven days, at which times the samples were removed from the distilled water. The dental cement mounted on each sample was then removed from the dental enamel and the solubility of the underlying enamel determined.

By comparing the solubility of the dental enamel underlying the experimental cements with the solubility of dental enamel that had been exposed to conventional magnesium oxide dental cement containing no added fluoride, a measure of the effectiveness of the added agents was obtained. The enamel solubility determinations were made at the two time periods (i.e., 24 hours or seven days) in order to obtain an estimation of both the short term and long range effects of the dental cement.

The solubilities of the dental cements of the present invention were determined by mixing each cement according to its recomended liquid-powder ratio and forming the dental cement into this discs having a diameter of 11 mm. and a thickness of 1 mm. After the discs had hardened, they were removed and allowed to dry for 15 minutes at room temperature, at which time they were placed in a humidor for 45 minutes at nearly 100% humidity in order to insure that all samples of dental cement had approximately the same water content. After the samples were removed from the humidor, they were placed in a sodium acetate buffer (pH 4.0) for a predetermined period of time (i.e., five days) and then were removed from the buffer solution. Then the buffer solutions were analyzed to determine the amount of cement that had been dissolved over the five-day period. This measurement provided an indication of the solubility of the given cement sample, and this measured solubility was then compared with the solubility of a conventional magnesium oxide dental cement containing no added fluoride in order to ascertain the relative effectiveness of the experimental dental cement sample. The diluted sodium acetate buffer solution was chosen as the environment for determining solubility of the dental cement because it closely approximates the system generally found in the oral cavity (i.e., a slightly acidic environment).

In order to determine the fluoride release characteristics of a given dental cement sample, discs of the cement measuring 6 mm. in diameter and 2 mm. in thickness were prepared and were suspended in solutions of redistilled water for a period of five days. The water solutions were changed at 24 hour intervals during this period. At the termination of the five-day period, all of the water samples were analysed for total fluoride, thus providing a measurement of the amount of fluoride that had been leached from the set dental cement over the five-day period.

The results of these investigations are summarized in Table I for several samples of zinc phosphate dental cements employing tin oxide as a condensing agent and containing from 0.5–10% stannous fluoride. For purposes of comparison, the enamel and cement solubility and fluoride release characteristics of two non-fluoride control cements (one using magnesium oxide and the other using tin oxide as a condensing agent) and two commercial cements using magnesium oxide, condensing agents are also shown. Neither of the commercial cements contain any tin oxide.

TABLE I.—SUMMARY OF ENAMEL AND CEMENT SOLUBILITY AND FLUORIDE RELEASE DATA WITH ZINC PHOSPHATE-$SnF_2$ CEMENTS

| | Composition (percent) | | | Enamel solubility after— | | | | | | Cement solubility | | | Fluoride release, total µg. during 5 days |
|---|---|---|---|---|---|---|---|---|---|---|---|---|---|
| | | | | 24 hours | | | 7 days | | | After 5 days (mg.) | Percent red[1] | Percent red[2] | |
| | $SnF_2$ | MgO | $SnO_2$ | Mean µg. Ca | Percent red[1] | Percent red[2] | Mean µg. Ca | Percent red[1] | Percent red[2] | | | | |
| Cement code number: | | | | | | | | | | | | | |
| 1 | 0.5 | | 5.0 | [3]84.8± 8.1 | 1.6 | 34.8 | [3]73.4±5.7 | 16.8 | 32.7 | 64.6 | +3.2 | 29.9 | 5.3 |
| 2 | 1.0 | | 5.0 | 58.3± 5.4 | 32.3 | 55.2 | 62.1±5.2 | 29.6 | 43.1 | 64.8 | +3.5 | 29.6 | 8.1 |
| 3 | 2.0 | | 5.0 | 61.1± 7.6 | 29.0 | 53.0 | 53.5±6.1 | 39.6 | 51.2 | 42.4 | 32.3 | 54.0 | 18.9 |
| 4 | 4.0 | | 5.0 | 63.7±16.4 | 26.0 | 51.0 | 42.0±4.3 | 52.4 | 61.5 | 61.4 | 1.9 | 33.3 | 60.2 |
| 5 | 6.7 | | 5.0 | 58.7±12.5 | 31.9 | 54.9 | 57.8±3.0 | 34.5 | 47.0 | 48.1 | 23.2 | 47.8 | 133.4 |
| 6 | 10.0 | | 5.0 | 50.4± 4.5 | 41.6 | 61.3 | 38.1±4.3 | 56.8 | 65.1 | 42.5 | 24.1 | 48.4 | 190.6 |
| Control: | | | | | | | | | | | | | |
| A | | 5.0 | | 86.2± 8.8 | | 33.8 | 88.2±6.8 | | 19.2 | 62.6 | | 32.0 | 1.9 |
| B | | | 5.0 | 130.2± 7.5 | +51.1 | | 109.1±5.5 | +23.7 | | 92.1 | +47.1 | | 4.2 |
| Commercial: | | | | | | | | | | | | | |
| I | | [4]5-15 | | 85.9±18.6 | 0.4 | 34.0 | 78.4±3.7 | 11.1 | 28.2 | 106.9 | +70.8 | +16.1 | 2.2 |
| II | | [4]5-15 | | 80.2±15.6 | 7.0 | 38.4 | 67.5±4.8 | 23.4 | 38.1 | 102.3 | +63.4 | +11.1 | 1.2 |

[1] As compared to Control Cement A.
[2] As compared to Control Cement B.
[3] Standard error of the mean.
[4] Atomic absorption analysis of the commercial products reveals the presence of substantial amounts of magnesium. However, because of water loss and chemical reactions occurring during sintering, it is impossible to determine the exact amount of MgO originally present. Thus, the 5-15% figure represents the best available estimate of the MgO content of the commercial products.

With regard to enamel solubility, these results indicate that the substitution of tin oxide for magnesium oxide as a condensing agent and the inclusion of 0.5–10% stannous fluoride reduced the enamel solubility of the dental enamel in both the short term and long range time periods. These results also show that the substitution of tin oxide for magnesium oxide as a condensing agent provided short term and long range protection for the dental enamel relative to the cements employing magnesium oxide, even when no fluoride was added to the cement. When at least 1% stannous fluoride was present, the experimental cements had better enamel solubility characteristics than the two commercial cements tested.

With regard to cement solubility, the substitution of tin oxide for magnesium oxide as a condensing agent caused a marked reduction in the solubility of dental cement (even without added fluoride), and the further addition of 2–10% stannous fluoride to the tin oxide dental cement powders further reduced the solubility of the dental cements. All of the dental cements employing tin oxide as a condensing agent, particularly those containing stannous fluoride, had much improved cement solubility characteristics over the magnesium oxide cement and both of the commercial cements tested.

With regard to fluoride release characteristics, the results indicate that substantial quantities of fluoride were released from all of the dental cements containing between 2–10% stannous fluoride, particularly those containing between 4–10% stannous fluoride.

In sum, these experimental evaluations show that the dental cements of the present invention provide increased protection for tooth surfaces underlying dental cements against attack by dental cement liquids during the application of the cement and against attack by oral acids upon the re-exposure of the tooth surfaces to the oral cavity. Further, these experimental evaluations show that the dental cements of the present invention are substantially less soluble than conventional dental cements in the oral cavity.

I claim:
1. A process for producing an improved dental cement powder adapted for use in formulating a zinc phosphate dental cement having improved anticariogenic and cement solubility characteristics consisting essentially of the steps of:

forming a mixture by admixing zinc oxide, ZnO, powder with about 3–15%, by weight of the mixture of an oxide of tin, with no more than about 0.5% magnesium oxide, MgO, by weight of the mixture being present in the mixture;

sintering the mixture;

mechanically reducing the sintered mixture into a cement powder having a particle size lying primarily in the range of about 2–10 microns; and thereafter admixing the cement powder with about 0.5 up to about 20% by weight of the cement powder of a member selected from the group consisting of stannous fluoride, $SnF_2$; stannous hexafluorozirconate, $SnZrF_6$; indium fluorozirconate, $InZrF_7$; zirconium hexafluorogermanate, $Zr(GeF_6)_2$; zirconyl hexafluorogermanate, $ZrOGeF_6$; indium hexafluorogermanate, $In_2(GeF_6)_3$; and mixtures thereof.

2. A process as claimed in claim 1, wherein the member is admixed at a level of about 2–10% by weight of the cement powder.

3. A process, as claimed in claim 2, wherein the member is admixed at a level of about 4–10% by weight of the cement powder.

4. A process, as claimed in claim 1, wherein the member is stannous fluoride, $SnF_2$.

5. A process, as claimed in claim 1 wherein the zinc oxide is employed in the range of about 65%–97% by weight of the mixture.

6. A dental cement powder produced by the process of claim 1.

7. A dental cement powder produced by the process of claim 2.

8. A dental cement powder produced by the process of claim 3.

9. A dental cement powder produced by the process of claim 4.

10. A dental cement powder produced by the process of claim 5.

References Cited

UNITED STATES PATENTS

| | | | |
|---|---|---|---|
| 3,510,225 | 5/1970 | Higashi et al. | 106—35 |
| 2,665,218 | 1/1954 | Saffir | 106—35 |
| 3,495,972 | 2/1970 | Baum | 32—15 |
| 3,507,041 | 4/1970 | Walraven, Jr. | 32—15 |

OTHER REFERENCES

Peyton Restorative Dental Materials, 3rd ed. C. V. Moseby, 1968, St. Louis, at pp. 419–20.

Anderson, Applied Dental Materials, 3rd ed., Blackwell Scientic Pubs. 1967, Oxford at p.321.

Manly et al., Journal of Dental Research, vol. 30, pp. 145–154.

Green et al., Effectiveness of NAF Dentifrices," J. Dent. Children, 34(2), pp. 122–127 (1967).

Stookey et al., "Laboratory Studies Concerning the Effectiveness & Safety of Fluoride & Fluoride-$Po_4$ Systems" J. Dent. Res.

Wei et al., "Remineralization of Carious Denture," J. Dent. Res. 47(3), pp. 381–391 (1968).

JOSEPH L. SCHOFER, Primary Examiner

D. A. JACKSON, Assistant Examiner

U.S. Cl. X.R.

32—8, 15